United States Patent
Waggoner et al.

(10) Patent No.: US 9,186,942 B1
(45) Date of Patent: Nov. 17, 2015

(54) FIFTH WHEEL SLIDEABLE HITCH ASSEMBLY

(71) Applicants: Christopher H. Waggoner, Greensboro, NC (US); Jeff R. Russell, Winston Salem, NC (US); Jacob C. Atwell, Greensboro, NC (US); Dallas V. Eisenhauer, Summerfield, NC (US)

(72) Inventors: Christopher H. Waggoner, Greensboro, NC (US); Jeff R. Russell, Winston Salem, NC (US); Jacob C. Atwell, Greensboro, NC (US); Dallas V. Eisenhauer, Summerfield, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 130 days.

(21) Appl. No.: 14/140,603

(22) Filed: Dec. 26, 2013

(51) Int. Cl.
  *B60P 3/22* (2006.01)
  *B60D 1/50* (2006.01)
  *B60D 1/01* (2006.01)

(52) U.S. Cl.
  CPC . *B60D 1/50* (2013.01); *B60D 1/015* (2013.01)

(58) Field of Classification Search
  CPC .......................... B62D 53/0807; B60D 1/015
  USPC ...................... 280/438.1, 441, 839
  See application file for complete search history.

(56) References Cited

U.S. PATENT DOCUMENTS

| | | | |
|---|---|---|---|
| 2,680,627 A | 6/1954 | Johnson et al. | |
| 2,713,500 A * | 7/1955 | Flynn | 280/407 |
| 2,807,477 A | 9/1957 | Tuso, Jr. | |
| 2,819,096 A | 1/1958 | Sencenich | |
| 2,900,194 A * | 8/1959 | De Lay | 280/656 |
| 2,985,463 A * | 5/1961 | Geerds | 280/407 |
| 3,030,125 A * | 4/1962 | Braunberger | 280/407 |
| 3,112,936 A * | 12/1963 | Cole et al. | 280/407 |
| 3,584,899 A | 6/1971 | Gottler | 280/407 |
| 3,722,914 A * | 3/1973 | Walther | 280/407 |
| 3,729,214 A * | 4/1973 | Mulcahy et al. | 280/407 |
| 3,826,516 A | 7/1974 | Weber | 280/407 |
| 3,843,159 A * | 10/1974 | Hood, II | 280/407 |
| 4,579,364 A | 4/1986 | Kranz | 280/507 |
| 5,449,191 A * | 9/1995 | Cattau | 280/438.1 |
| 5,529,329 A | 6/1996 | McCoy | 280/438.1 |
| 5,707,070 A | 1/1998 | Lindenman et al. | 280/438.1 |
| 5,772,229 A | 6/1998 | Cattau | 280/438.1 |
| 5,839,745 A | 11/1998 | Cattau et al. | 280/434 |
| 6,247,720 B1 | 6/2001 | Linger et al. | 280/441 |
| 6,386,570 B2 | 5/2002 | Linger et al. | 280/441 |
| 6,485,045 B1 | 11/2002 | King | 280/417.1 |
| 6,557,883 B2 | 5/2003 | Linger et al. | 280/441 |
| 6,592,140 B1 * | 7/2003 | Alguera Gallego et al. | 280/441 |
| 6,682,089 B2 | 1/2004 | McCoy et al. | 280/438.1 |
| 6,685,210 B2 | 2/2004 | Lindenman et al. | 280/441 |
| 6,695,337 B1 * | 2/2004 | Breese et al. | 280/433 |
| 7,114,740 B1 * | 10/2006 | Mann et al. | 280/438.1 |
| 7,584,982 B2 | 9/2009 | Fisher | 280/438.1 |
| 7,699,334 B1 * | 4/2010 | Mann et al. | 280/407.1 |
| 7,726,678 B1 * | 6/2010 | Connell et al. | 280/441 |
| 7,806,424 B2 * | 10/2010 | Burns et al. | 280/433 |
| 8,220,818 B1 * | 7/2012 | Pulliam et al. | 280/441 |
| 8,342,558 B1 | 1/2013 | Su | 280/438.1 |
| 8,371,601 B2 * | 2/2013 | Mann | 280/433 |

(Continued)

*Primary Examiner* — Joseph Rocca
*Assistant Examiner* — Conan Duda
(74) *Attorney, Agent, or Firm* — Blake P. Hurt; Tuggle Duggins P.A.

(57) ABSTRACT

A fifth wheel slideable hitch assembly with a pair of base rails defining apertures to receive rollers. The rollers protrude out of the base rails and contact the underside of corresponding uprights, allowing for longitudinal displacement of the uprights and a fifth wheel fore and aft. The assembly also includes a T-shaped selector plate and an indicator pin that clearly alerts a user to the status of the hitch position.

20 Claims, 9 Drawing Sheets

(56) References Cited

U.S. PATENT DOCUMENTS

| | | | |
|---|---|---|---|
| 8,511,703 B2 | 8/2013 | Peterson et al. | 280/438.1 |
| 8,573,627 B2* | 11/2013 | Appel | 280/441 |
| 8,672,340 B1* | 3/2014 | Hartman et al. | 280/438.1 |
| 8,960,705 B2* | 2/2015 | McCall | 280/438.1 |
| 2001/0020776 A1* | 9/2001 | Linger et al. | 280/441 |
| 2002/0121762 A1* | 9/2002 | Laarman | 280/434 |
| 2003/0034631 A1* | 2/2003 | Lindenman et al. | 280/438.1 |
| 2003/0160429 A1* | 8/2003 | McCoy et al. | 280/433 |
| 2004/0145151 A1* | 7/2004 | Grinde et al. | 280/438.1 |
| 2004/0173992 A1* | 9/2004 | Stunder et al. | 280/438.1 |
| 2005/0248124 A1* | 11/2005 | Phillips et al. | 280/477 |
| 2006/0202443 A1* | 9/2006 | Sibley et al. | 280/441 |
| 2007/0176395 A1* | 8/2007 | Warnock | 280/438.1 |
| 2007/0290481 A1* | 12/2007 | Fisher | 280/438.1 |
| 2008/0029995 A1* | 2/2008 | Alguera | 280/407.1 |
| 2008/0315557 A1* | 12/2008 | Stanifer et al. | 280/434 |
| 2011/0109061 A1* | 5/2011 | Peterson et al. | 280/438.1 |
| 2012/0001404 A1* | 1/2012 | Mann et al. | 280/438.1 |
| 2013/0099464 A1* | 4/2013 | Peterson et al. | 280/407 |
| 2013/0106076 A1* | 5/2013 | Zaagman | 280/438.1 |
| 2013/0285348 A1* | 10/2013 | Schmitt et al. | 280/438.1 |
| 2013/0297154 A1* | 11/2013 | Burchett et al. | 701/49 |
| 2014/0346754 A1* | 11/2014 | Zerba et al. | 280/433 |

* cited by examiner

FIFTH WHEEL SLIDEABLE HITCH ASSEMBLY

FIELD OF THE INVENTION

The invention herein pertains to trailer hitches and particularly pertains to slideable fifth wheel trailer hitches with uprights that displace fore and aft to allow for greater maneuverability in crowded traffic conditions.

DESCRIPTION OF THE PRIOR ART AND OBJECTIVES OF THE INVENTION

Slideable tow hitch assemblies are known in the art as a way to increase maneuverability in tight operating environments without sacrificing stability when traveling long distances. Typically, these assemblies include a fifth wheel that is supported by one or more uprights that displace longitudinally relative to the tow vehicle. For example, a fifth wheel may receive the kingpin of a trailer and be positioned in a first position substantially over the rear axle of a tow vehicle to provide a stable towing platform resistant to skidding or jack-knifing. The fifth wheel may be selectively displaced rearward of the first position to allow for greater clearance between the towing vehicle and the trailer, increasing maneuverability in operating environments such as parking lots or camp sites which may require a tighter turning radius.

It is no small feat to securely attach the towing vehicle to a trailer, and the greater the towed load, the larger the vehicles involved become. It may be inconvenient to return to the tow vehicle only to become unsure as to whether the hitch assembly is in the incorrect or unsecured position, or further to have little in the way of assurance that a dangerous towing condition may or may not be present.

Thus, in view of the problems and disadvantages associated with prior art hitches, the present invention was conceived and one of its objectives is to provide a fifth wheel slideable hitch assembly capable of displacing fore and aft.

It is another objective of the present invention to provide a fifth wheel slideable hitch assembly with base rails containing rollers.

It is still another objective of the present invention to provide a hitch assembly with rollers protected by flanges from the elements and shielded from debris that may obstruct roller operation.

It is yet another objective of the present invention to provide a fifth wheel slideable hitch assembly that longitudinally displaces via rollers which protrude from a plurality of apertures in the base rails.

It is a further objective of the present invention to provide a hitch assembly with a vertically off-set locking pin position within an upright.

It is still a further objective of the present invention to provide a fifth wheel slideable hitch assembly with a lift defined by a pair of arms forming a channel therebetween to receive a locking pin.

It is yet a further objective of the present invention to provide a fifth wheel slideable hitch assembly with a clearly visible indicator pin that displays to a driver the status of the hitch assembly.

It is another objective of the present invention to provide a hitch assembly with dual hitch position confirmation.

It is a further objective of the present invention to provide a fifth wheel slideable hitch assembly with a handle in communication with a pair of locking pins, all of which are capable of displacing laterally.

Various other objectives and advantages of the present invention will become apparent to those skilled in the art as a more detailed description is set forth below.

SUMMARY OF THE INVENTION

The aforesaid and other objectives are realized by providing a fifth wheel slideable hitch assembly for slideably increasing or decreasing the distance between a tow vehicle and a towed load, for example a trailer, camper, fifth wheel, or the like. The hitch assembly includes a pair of base rails affixed in parallel along the longitudinal axis of the tow vehicle, such as in the bed of a pickup truck. Each base rail contains a plurality of rollers mounted within that protrude outwardly through apertures defined in the top of the base rails. Two or more rollers contact the underside of a planar base defined by each of a pair of U-shaped uprights. Each upright houses a locking mechanism comprising an indicator pin, a lift, and a spring-biased and off-set positioned locking pin that is lifted out of pin apertures in the upright base and base rail and laterally displaced by a pair of arms affixed to the lift. The indicator pins are each in communication with the lifts and the respective lifts are in communication with one another via a transfer rod that spans the lateral distance between the two uprights and connects to a post attached to each lift. A separate coupling post extends opposite the rod and engages a handle, which allows a user to manually urge the indicator pins and locking pins between a first, engaged position and a second, disengaged position. The handle may be connected to a post and includes a safety pin that is inserted into one of the uprights to prevent a lift from inadvertently displacing the locking pin.

The handle may be urged in counterclockwise and lateral directions, causing the lifts to vertically and horizontally displace the locking pins from respective pin apertures. This displacement is identified by the indicator pin moving from a first to a second position as defined by the selector plate. This indication is easily viewed by a user, even when the user is located in the tow vehicle, reducing the likelihood of an unsafe or undesirable towing orientation during use.

DETAILED DESCRIPTION OF THE PREFERRED EMBODIMENT AND OPERATION OF THE INVENTION

Figure 6:
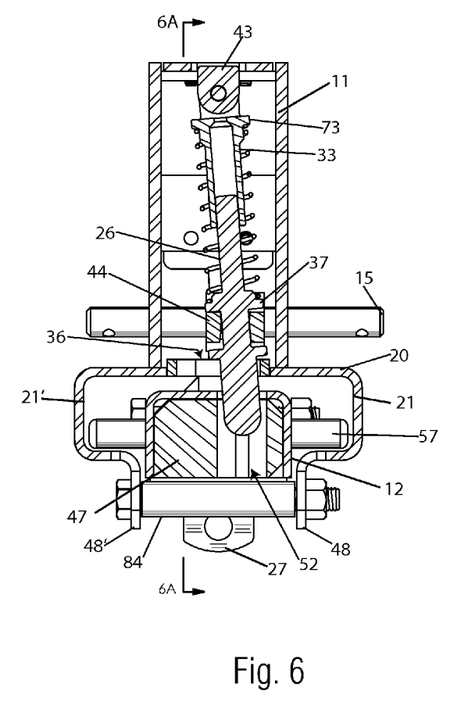
FIG. 6 illustrates a cross-sectional rear view of the upright in FIG. 2 as along lines 6-6.
Figure 6A:
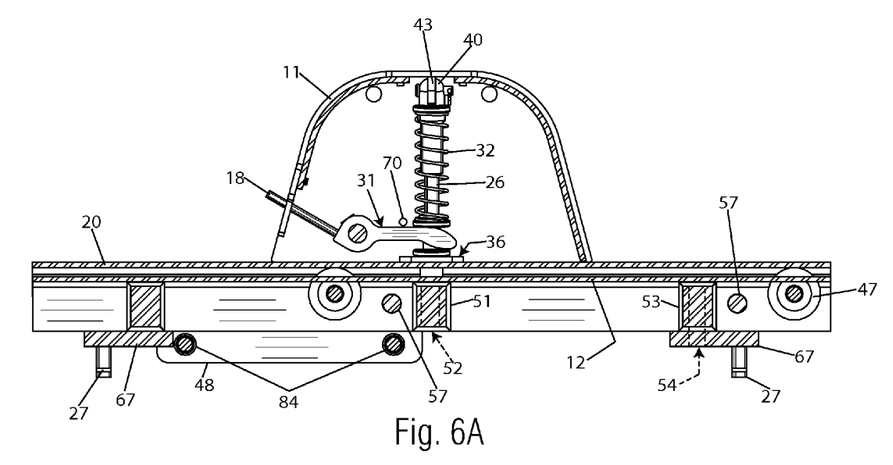
FIG. 6A pictures a cross-sectional view of the upright as shown in FIG. 5 as along lines 6A-6A of FIG. 6.
Figure 7:
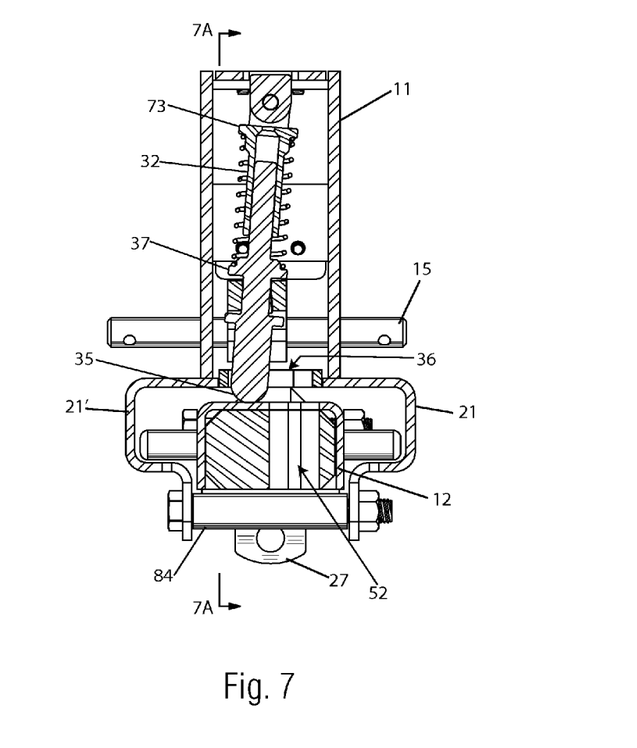
FIG. 7 features a cross-sectional rear view of the upright in FIG. 3 as along lines 7-7.
Figure 7A:
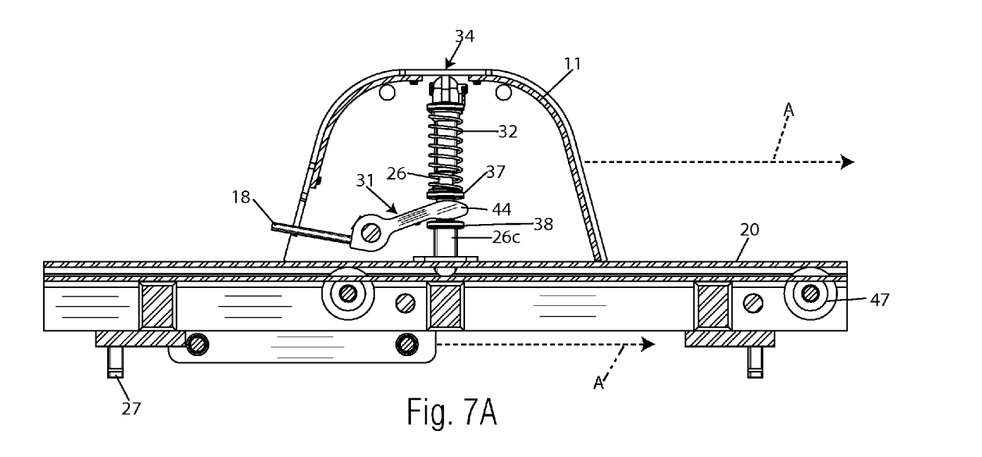
FIG. 7A demonstrates a cross-sectional view of the upright as shown in FIG. 5 as along lines 7A-7A of FIG. 7.
Figure 8:
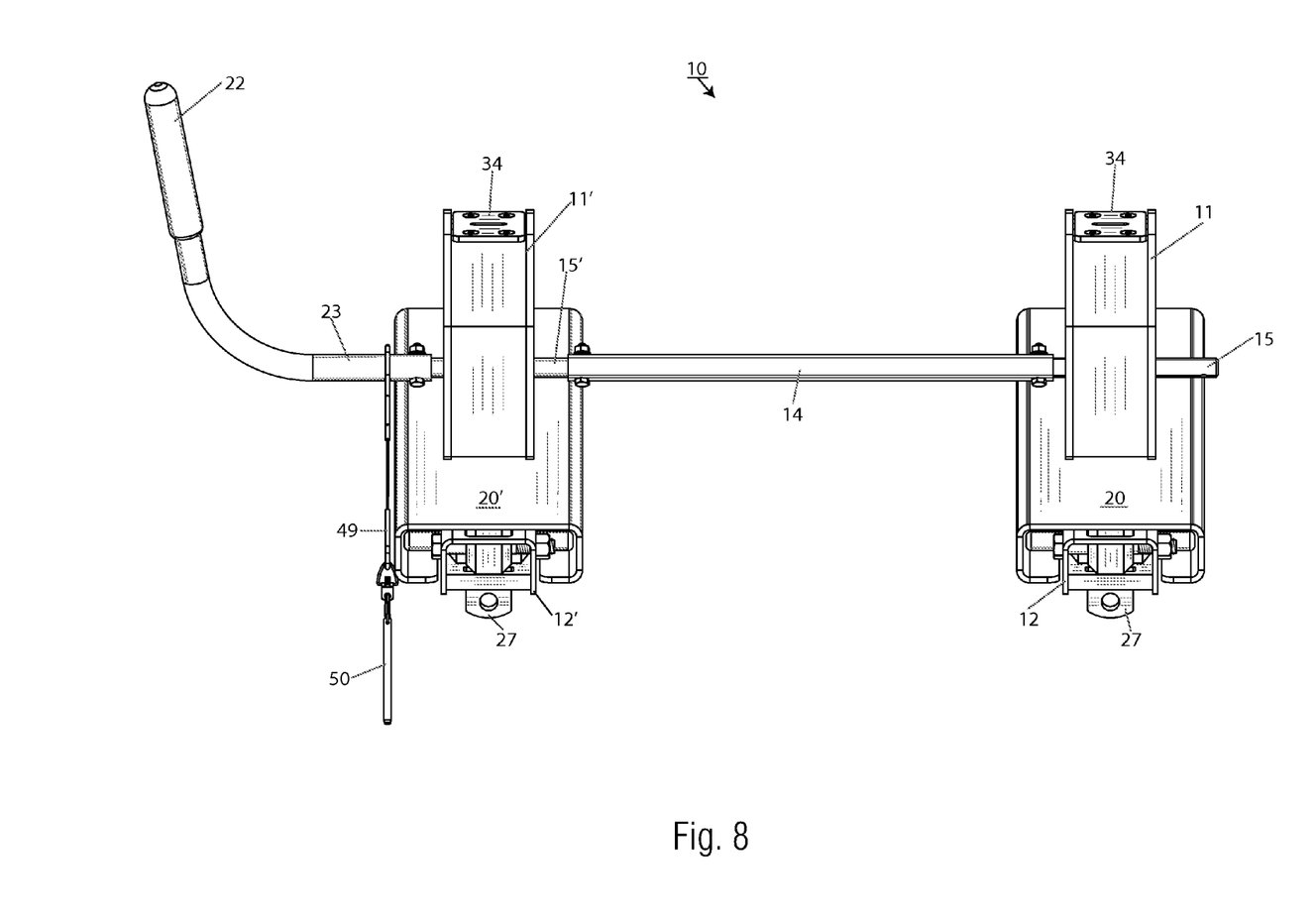
FIG. 8 illustrates an elevated, angled rear view of the slideable hitch of FIG. 1 assembled.

For a better understanding of the invention and its operation, turning now to the drawings, FIGS. 1-10 illustrate fifth wheel slideable hitch assembly 10 including a pair of uprights 11, 11' positioned on a pair of base rails 12, 12' for longitudinally displacing fifth wheel 13 in relation to a tow vehicle. As seen in partially exploded FIG. 1, base rails 12, 12' with uprights 11, 11' and respective posts 15, 15' are laterally spaced to receive cylindrical transfer rod 14 therebetween. Rod 14 and posts 15, 15' each include pairs of opposing apertures proximate the ends thereof and transfer rod is sized to fit over posts 15, 15' for reception of for example threaded fasteners 16 and nuts 17 in corresponding apertures. Transfer rod 14 and posts 15, 15' are in rotatable communication with handle 22 via post coupling 23. FIG. 8 presents an assembled rear angled view of hitch assembly 10.

Figure 1:
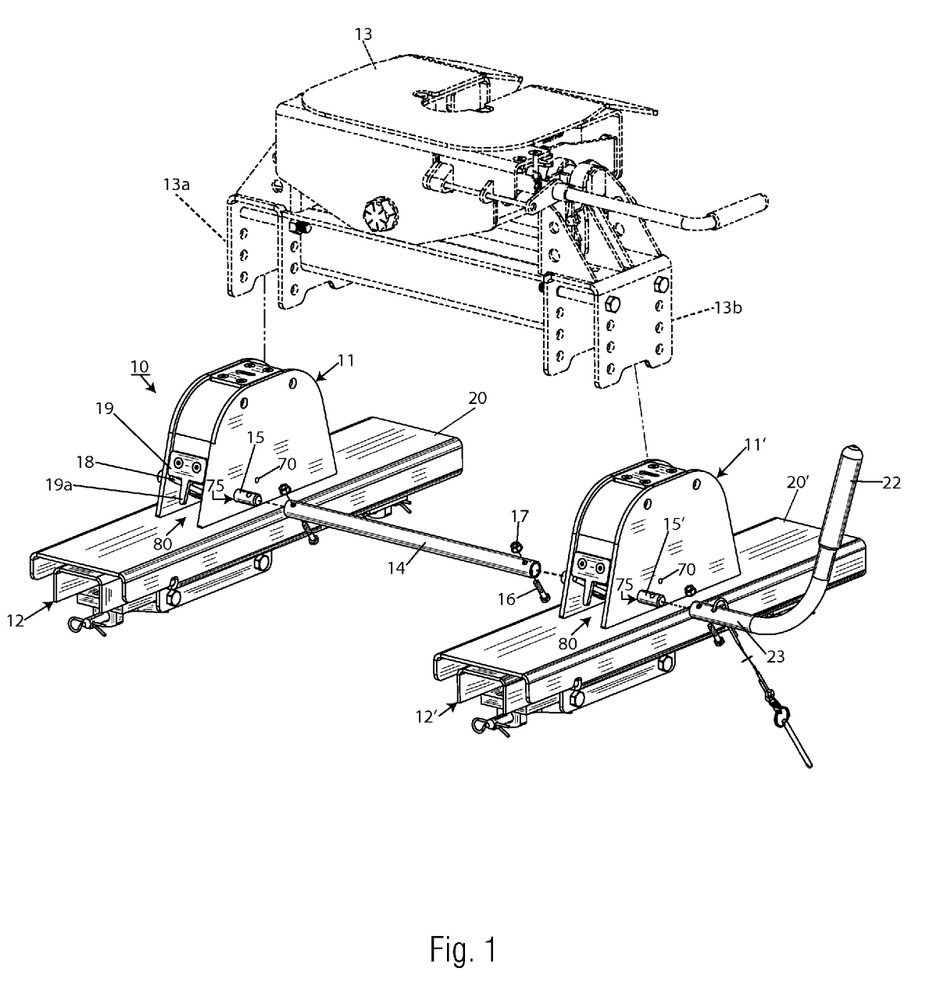
FIG. 1 shows an exploded front, right side perspective view of a fifth wheel slideable hitch assembly with a fifth wheel shown in ghost fashion.

As would be understood uprights 11, 11' are identical in structure and as such only one is described in detail with the understanding that the description equally applies to both. Further, the positioning shown in FIG. 1 schematically illustrates the positioning and attachment of fifth wheel 13 overtop hitch assembly 10 such that the cab of the towing vehicle would be in front whereby handle 22 is proximate the driver's side of the vehicle (not shown) for easy, convenient use. Fifth wheel 13 is represented in FIG. 1 with dotted lines to indicate the conventional structure of a fifth wheel as known in the art. It should be understood that hitch assembly 10 may engage any fifth wheel variation, and any minor modifications to accommodate connection are within the scope of the structure of hitch assembly 10. Further, uprights 11, 11' each include pairs of opposing upper apertures on each side proximate mount plates for attachment of sides 13a, 13b of fifth wheel 13 by fasteners such as for example bolts with washers and nuts as is conventional.

Preferred upright 11 as shown in a front perspective view in FIG. 1 forms an inverted U-shape opening downward towards planar base 20 forming a stable vertical structure and may be rigidly attached thereto by welding or the like, or may be integrally formed from the same material, such as steel. Upright 11 includes T-shaped selector plate 19 having downwardly depending guide 19a on the front thereof forming U-shaped opening 80 and includes opposing apertures 75 on the sides for reception of post 15. Upright 11 also preferably includes a pair of opposing flanges 21, 21' vertically affixed to opposing longitudinal sides of planar base 20 or integrally formed therewith. Flanges 21, 21' serve to prevent dirt, debris, or other obstructions from accessing rollers 47 and fouling their engagement with upright 11.

Figure 2:
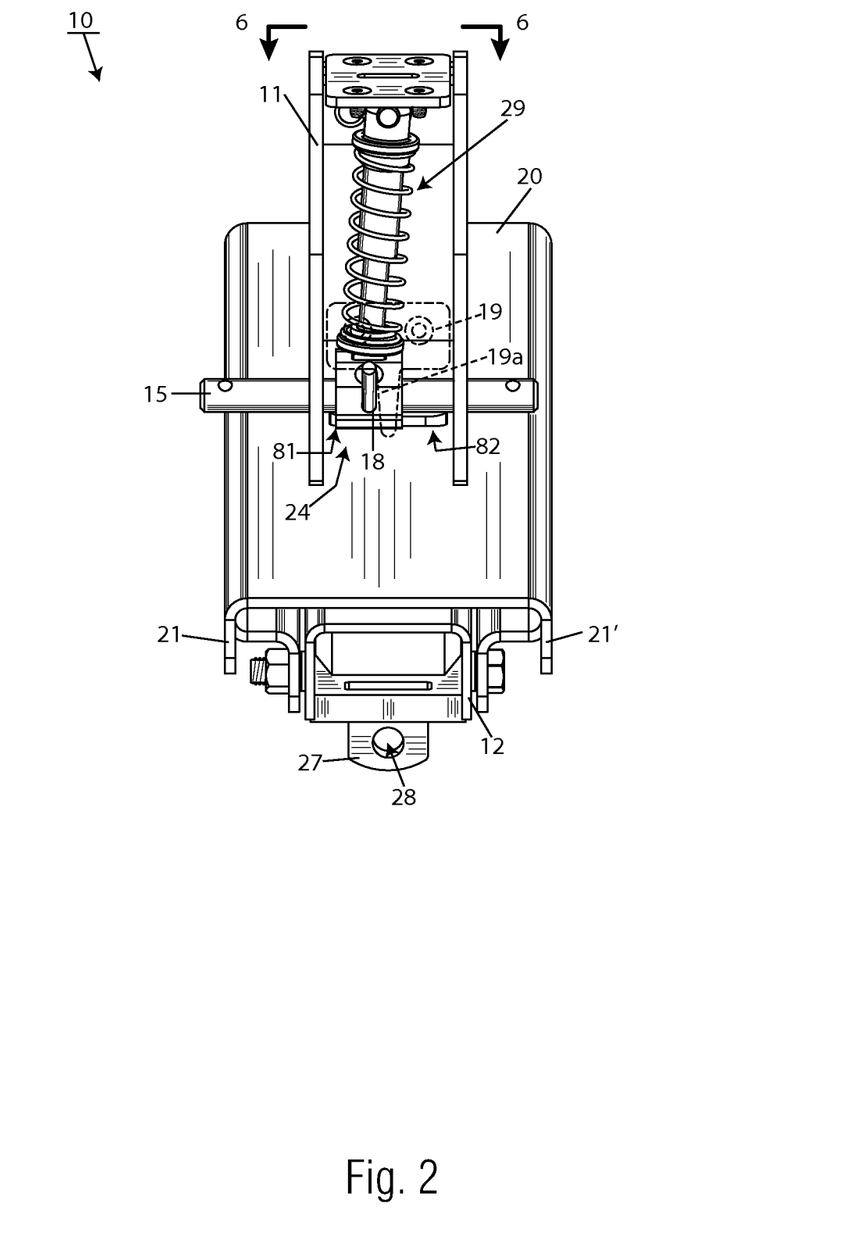
FIG. 2 pictures an elevated, angled front view of an upright of the slideable hitch assembly of FIG. 1 with a portion of the upright removed for clarity of the indicator pin and locking pin both in a first position.
Figure 3:
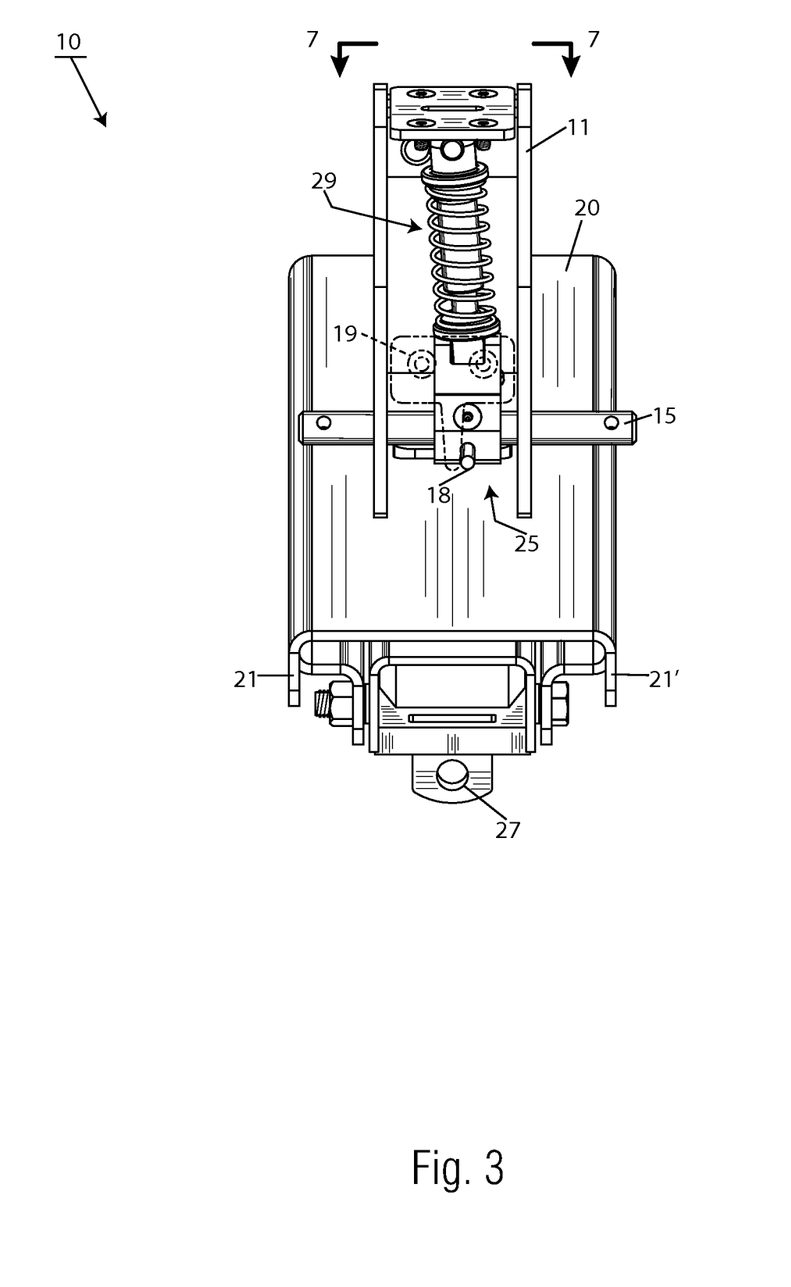
FIG. 3 depicts the upright as seen in FIG. 2 with the indicator pin and locking pin both in a second position.
Figure 4:
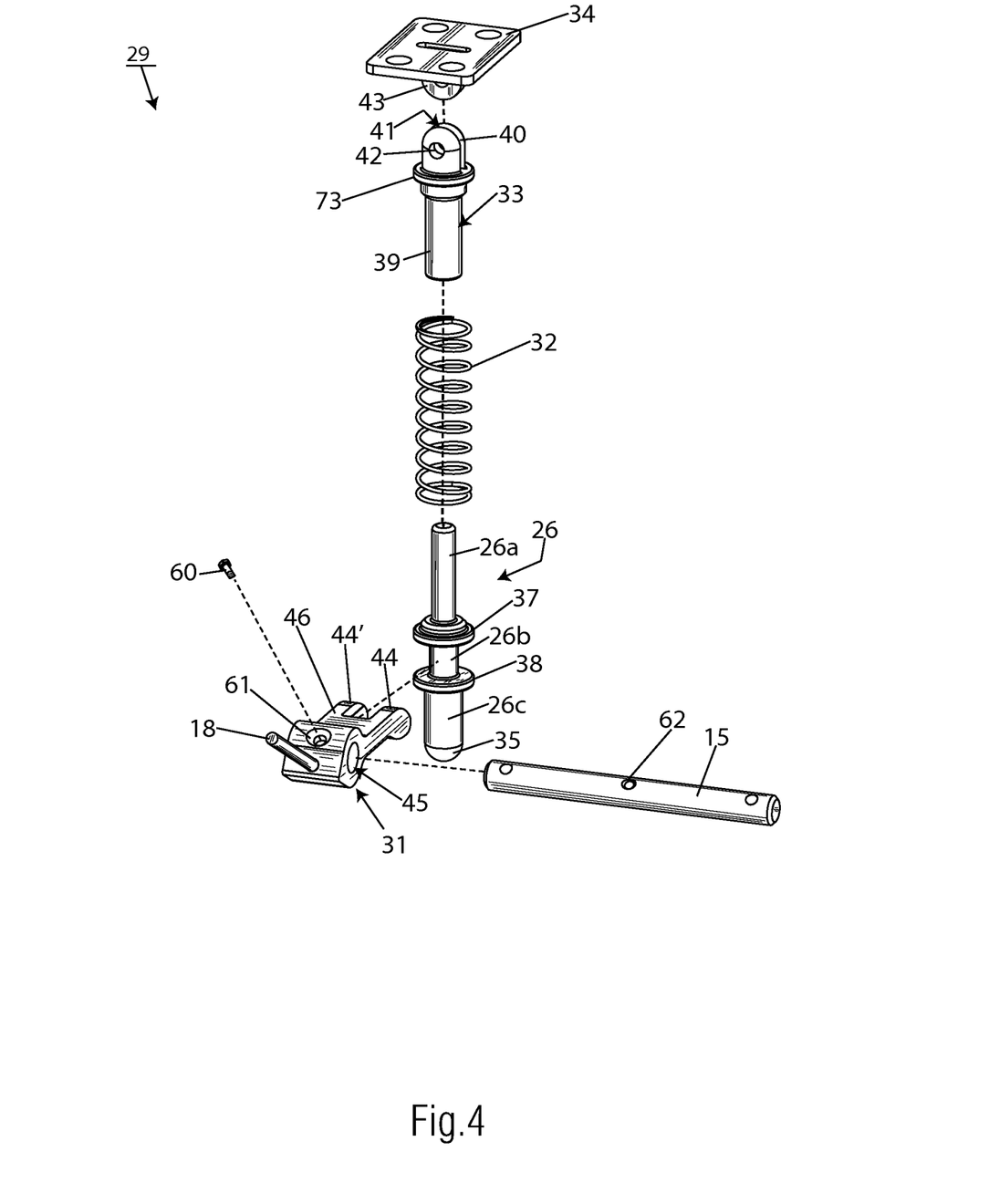
FIG. 4 demonstrates an exploded front, right side perspective view of a locking mechanism as removed from the slideable hitch of FIG. 1.

FIG. 2 pictures an elevated, angled front view of upright 11 of slideable hitch assembly 10 with locking mechanism 29 and indicator pin 18 in first, engaged position 24 as defined by selector plate 19, shown in FIGS. 2 and 3 with dotted lines to clarify the inner components of upright 11. FIG. 3 pictures an angled, elevated front view of upright 11 with locking mechanism 29 and indicator pin 18 in second, disengaged position 25. The T-shape and positioning of selector plate 19 with guide 19a in upright 11 defines U-shaped opening 80 (FIG. 1) having first channel 81 correlating with first position 24 and second channel 82 correlating with second position 25. As seen in FIG. 4, post perpendicularly engages lift 31, allowing for frictional communication between post 15 and indicator pin 18, respectively. Practically, when post 15 is laterally displaced as shown in FIG. 3, indicator pin 18 displaces laterally a corresponding distance from first position 24 to second position 25. This displacement, discussed further below and as shown in FIGS. 6-7A, results in locking pin 26 transitioning from first, engaged position 24 in which locking pin 26 is positioned within aperture 36 (FIG. 6A) formed in planar base 20 of upright 11 and base rail aperture 52 (FIG. 10) formed within first brace 51, to second, disengaged position 25 with respect to base rail 12, in which locking pin 26 is vertically and horizontally displaced from rail aperture 52. Upright 11 may displace longitudinally away from a towed vehicle until locking pin 26 pivots about mount plate 34, changing the orientation of the vertical axis of locking pin 26 and encountering second base rail aperture 54 (FIG. 9), defined within second brace 53, which is positioned further aft and longitudinally offset in relation to first base rail aperture 52.

Figure 5:
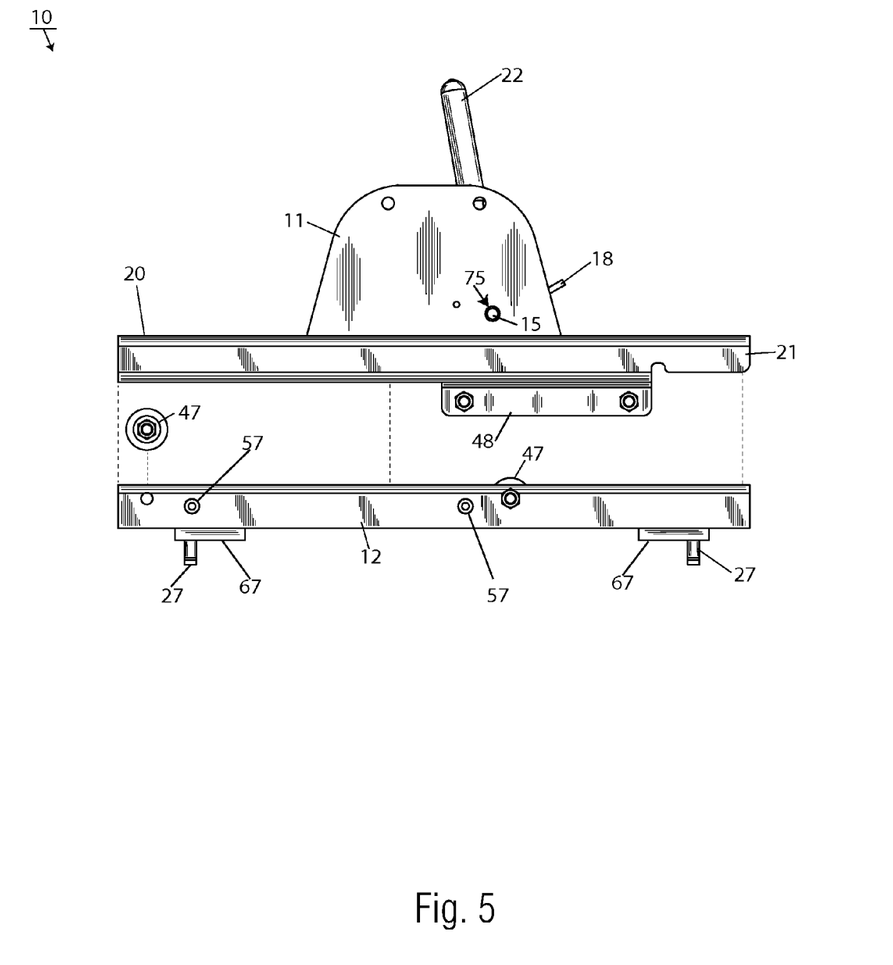
FIG. 5 shows a left side view of an upright and roller exploded from a base rail.

As shown in FIG. 5, base rail 12 includes a pair of stops 67 rigidly affixed to the bottom proximate the ends thereof and having opposing tabs 27 which each define tab aperture 28 (FIG. 2). Tab 27 may be inserted into a corresponding aperture, for example in a mounting rail positioned perpendicular to base rail 12 within the bed of a tow vehicle (not shown), and secured with a fastener to affix fifth wheel slideable hitch assembly 10 to the tow vehicle for towing capabilities as is known in the art. As described above, FIG. 3 depicts an angled, elevated front view of upright 11 of slideable hitch 10 with indicator pin 18 in second, disengaged position 25, for example in a laterally displaced position relative to upright 11. Practically, when locking pin 26 sufficiently displaces longitudinally to engage second base rail aperture 54, indicator pin 18 defines an opposing position to that shown in first position 24, after transitioning from second position 25 with respect to selector plate 19.

Figure 9:
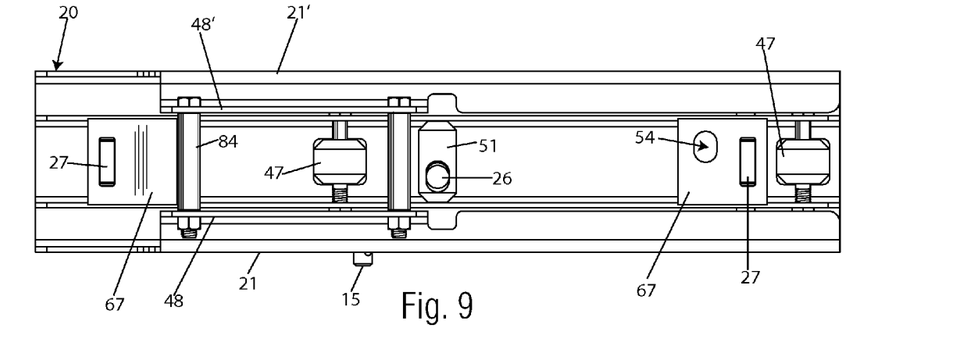
FIG. 9 depicts a bottom plan view of the upright of the slideable hitch as shown in FIG. 2.
Figure 10:
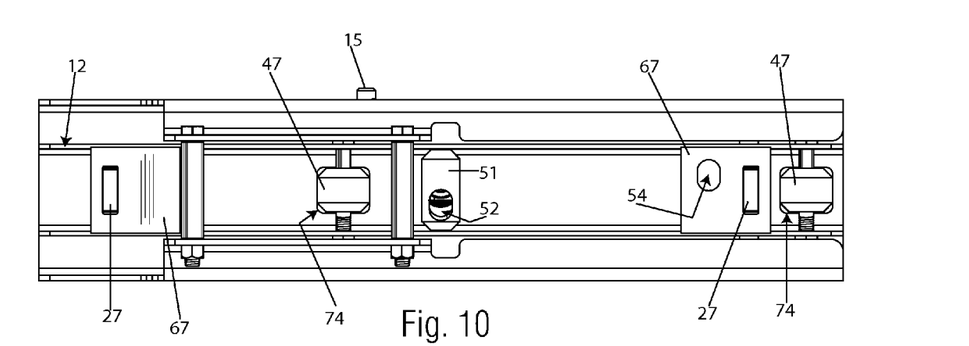
FIG. 10 illustrates a bottom plan view of the upright of the slideable hitch as shown in FIG. 3.

FIG. 4 demonstrates an exploded front, right side perspective view of locking mechanism 29 as removed from upright of fifth wheel slideable hitch assembly 10. Locking mechanism 29 includes post 15, lift 31, locking pin 26, biasing member 32, pin housing 33, and mount plate 34. Although the components of a single locking mechanism 29 are displayed, it should be understood that an identical locking mechanism 29 is deployed within opposing upright 11'. Locking pin 26 is generally cylindrical as seen by smaller, upper cylindrical body 26a, mid-cylindrical body 26b and larger, lower cylindrical body 26c with disks 37, 38 positioned therebetween. Lower cylindrical body 26c preferably defines wide, curved end 35 sized for insertion within upright aperture 36 (FIGS. 6 and 7) and base rail apertures 52 and 54 (FIGS. 9 and 10). Lower cylindrical body 26c is connected to the lower of two disks 37, 38 which define the engagement point, mid-cylindrical body 26b, of lift 31 with locking pin 26. Lower disk 38 defines a planar, circular member with a diameter slightly greater than that formed by curved end 35 while upper disk 37 is a two-tiered circular member that serves as a base for biasing member 32 in addition to engaging lift 31. Biasing member 32 may be any structure capable of imparting sufficient downward force to secure locking pin 26 into an engaged position within apertures 36 and 52 or 54, but is preferably represented as a coil spring positioned between locking pin 26 and pin housing 33. Pin housing 33 includes cylindrical housing 39, disk 73 and pivotal slot 40. Housing 39 defines an opening sized to slideably receive upper cylindrical body 26a of locking pin 26 therein (FIG. 7). Slot 40 is preferably a two-piece hemisphere that defines channel 41 therebetween and opposing attachment bores 42 on each hemisphere. Channel 41 is oriented to receive ear 43 positioned on the underside of mounting plate 34, and connects thereto, for example with a fastener which passes through both attachment bores 42 and a corresponding aperture defined in ear 43. The engagement of ear 43 with pin housing 33 permits approximately fifteen degrees (15°) of rotation for the longitudinal axis of pin 26.

Lift 31 includes indicator pin 18, lift body 46, and arms 44, 44'. Lift body 46 defines aperture 45 sized to receive post 15 therethrough which is secured therein by threadable fastener 60 through aperture 61 in lift body 46 which threadably engages corresponding aperture 62 in post 15. Such engagement causes simultaneous pivoting movement of lift 31 when post 15 is rotated. Lift body 46 preferably defines a generally U-shaped end opposite indicator pin 18 that includes a pair of parallel arms 44, 44' having bulbous ends for manually engaging mid-cylindrical body 26b of locking pin 26 between disks 37 and 38. Lift 31 acts as a fulcrum as post 15 is rotated and laterally displaced, causing corresponding action by lift 31 which leads to horizontal and vertical displacement of locking pin 26 (see FIGS. 6-7A). Arms 44, 44' may be any structure capable of overcoming biasing member 32 and vertically displacing locking pin 26, but preferred arms 44, 44' define an arcuate terminal end with a greater width than the remaining length of arms 44, 44' to more securely engage locking pin 26 during displacement as seen in FIGS. 6A and 7A than arms with no rise. Mount plate 34 is a planar member with ear 43 rigidly affixed therebelow and may define a plurality of apertures to receive fasteners such as screws, bolts, or the like for attachment to upright 11 for ensuring adequate compression of biasing member 32 during normal operation of hitch assembly 10.

FIG. 5 demonstrates a side view of upright 11 with one roller 47 and base rail 12 exploded therefrom. As shown in FIGS. 1-3, 6 and 7, flanges 21, 21' extend downwardly from planar base 20 and include an opposing pair of extension tabs 48, 48' which continue in a downward direction opposite planar base 20 and extend beyond the bottom surface of base rail 12 as shown in FIGS. 6 and 7. Tabs 48, 48' are approximately a third of the length of planar base 20 with one end proximate the midpoint thereof when locking mechanism 29 is in first position 24. Tabs 48, 48' define one or more apertures for receiving fasteners 84 such as screws, bolts, or the like for attaching upright 11 overtop base rail 12 while permitting longitudinal displacement of upright 11 relative to base rail 12. Base rail 12 further includes a pair of alignment pins 57 (FIGS. 5-6A) rigidly affixed therethrough that assist in keeping upright 11 square when transitioning from one position to another during displacement. Alignment pins 57 also assist in preventing separation of upright 11 from base rail 12. One or more rollers 47 are positioned within base rail 12 and attached with an axle, nuts, washers, and other hardware known in the art. Although roller 47 is preferred, other transportive members such as friction-reducing shoes are also contemplated. Rollers 47 are spaced along the longitudinal length of base rail 12 to provide efficient displacement of upright 11, regardless of the desired position of fifth wheel 13.

As opposed to the front views shown in FIGS. 2 and 3, FIGS. 6 and 7 illustrate cross-sectional rear views of upright 11 with locking pin 26 shown in first and second positions 24, 25, along lines 6-6, and 7-7 respectively to demonstrate the positioning and movement of locking mechanism 29. FIGS. 6A and 7A picture side cross-sectional views of upright 11 as viewed from respectively lines 6A-6A and 7A-7A to demonstrate the positioning and movement of lift 31. As schematically illustrated in FIGS. 6 and 6A, curved end 35 of locking pin 26 rests within aperture 52 (first position 24) of base rail 12, lower cylindrical body 26c is maintained within aperture 36 of planar base 20, mid-cylindrical body 26b is engaged by arms 44, 44' as smaller, upper cylindrical body 26a rests within the opening of cylindrical housing 39 of pin housing 33. Biasing member 32 is maintained uncompressed between disk 37 of locking pin 26 and disk 73 of pin housing 33 and ear 43 is contained within pivotal slot 40. In this position with locking pin 26 in aperture 52, locking mechanism 29 is angled to the right and post 15 extends slightly over the right side of planar base 20. As seen in FIG. 6A, lift 31 is positioned such that arms 44, 44' are generally horizontal with planar base 20 and indicator pin 18 abuts selector plate 19 in channel 81 in first position 24 as seen in FIG. 2.

FIGS. 7 and 7A schematically illustrate second position 25 whereby curved end 35 of locking pin 26 is removed from aperture 52 and rests atop base rail 12 in opposing relation. Upper cylindrical body 26a of locking pin 26 has been pushed upward within the opening of cylindrical housing 39 of pin housing 33 as biasing member 32 is now shown compressed between disk 37 of locking pin 26 and disk 73 of pin housing 33. In this position pivotal slot 40 has pivoted on ear 43 such that locking pin 26 is now displaced (angled) to the left whereby post 15 likewise extends slightly over the left side of planar base 20. As seen in FIG. 7A, lift 31 is now angled upwardly such that arms 44, 44' are applying pressure, compressing biasing member 32 and lifting locking pin 26 upwardly such that indicator pin 18 has now shifted downwardly about guide 19a of selector plate 19 into second, disengaged position 25 as shown in FIG. 3 within channel 82.

As would be understood when indicator pin 18 moves from first position 24 (channel 81) to second position 25 (channel 82), locking pin 26 is manually urged in an upward direction by arms 44, 44' while compressing biasing member 32. In addition to this vertical displacement, post 15 in communication with indicator pin 18 displaces laterally as well, for example by a user manually urging handle 22 in a lateral and counterclockwise pulling fashion. As locking pin 26 is removed from corresponding upright aperture 36 and base rail aperture 52, upright 11 is free to move in a longitudinal manner as seen by arrows A in FIG. 7A, for example increasing the distance between fifth wheel 13 and the tow vehicle. As would be understood, stops 67 assist in controlling the longitudinal movement of upright 11 relative to base rail 12 such that during longitudinal displacement fasteners 84 connecting tabs 48, 48' will abut the innermost ends of stops 67 thus halting and preventing further movement of upright 11 in either direction.

As shown in FIGS. 2 and 3, locking pin 26 may not define a longitudinal axis perfectly perpendicular to planar base 20, but may form a slight offset angle while pivoting about mount plate 34. Because biasing member 32 is in the coiled or compressed position when locking pin 26 is in second, disengaged position 25, when upright 11 is displaced, pin 26 will insert into second base rail aperture 54 formed within second base rail brace 53 at the appropriate longitudinal displacement causing indicator pin 18 to be fully received within channel 82 in opposing relation to the position as shown in FIG. 2. Such seating of locking pin 26 causes handle 15 to return to its normal, engaged position. In order to accommodate the offset vertical axis of locking pin 26, first and second base rail apertures 52 and 54 are formed in diagonal opposing relation and do not share the same lateral placement on base rail 12. For example, first base rail aperture 52 may define a closer proximity to the longitudinal midline of hitch assembly 10 compared to second base rail aperture 54.

When post 15 is rotated and urged laterally in the opposing direction to remove pin 26 from second base rail aperture 54, for example by a user pushing handle 22 in a counterclockwise direction, locking pin 26 is lifted upwardly by lift 31 thus compressing biasing member 32 whereby locking mechanism 29 is displaced. Curved end 35 is thus removed from second base rail aperture 54 and locking mechanism 29 pivots to the right and allows upright 11 to longitudinally move forward towards the tow vehicle. Fastener 84 of extension tabs 48, 48' abut stops 67 and locking pin 26 downwardly engages base rail aperture 52 as seen in FIG. 6 and indicator pin 18 returns to first, engaged position 24.

FIGS. 9 and 10 display bottom plan views of hitch 10 with pin 26 positioned in first base rail aperture 52 and then removed therefrom as represented in FIGS. 2, 3, 6, 6A, 7, and 7A. As shown schematically in FIGS. 6A, 7A, 9, and 10 first brace 51 and second brace 53 may be rigidly affixed to base rail 12 or preferably integrally formed therewith. Both first and second braces 51 and 53 define respective apertures 52, 54 that are sized to receive curved end 35 of locking pin 26. The squared shape of braces 51 and 53 creates added structural stability for hitch 10 as well as ensuring that pin 26 does not release from engagement with either first or second rail apertures 52, 54. As described, locking pin 26 is removed from first rail aperture 52 and upright 11 may longitudinally displace as demonstrated by arrows A away from a tow vehicle until pin 26 engages second base rail aperture 54, increasing the distance between the tow vehicle and hitch assembly 10, allowing for greater maneuverability of the towed load in tight quarters such as parking lots and camp grounds.

In use, hitch assembly 10 is installed by placing mount rails perpendicularly to the desired direction of hitch travel into the tow vehicle, for example the bed of a truck. The mount rails include apertures for receiving front and rear tabs 27 of base rails 12, 12'. One or more rollers 47 are inserted into base rails 12, 12' before fastening tabs 27 to the mount rails, for example with a bolt or a threaded fastener and corresponding nut. Uprights 11, 11' are then slideably positioned on base rails 12, 12' engaging rollers 47 and ensuring that planar bases 20, 20' with flanges 21, 21' and extension tabs 48, 48' encircle base rails 12, 12' on the top and both sides as seen for example in FIGS. 6 and 7. Fasteners 84 are passed through tabs 48, 48' below base rails 12, 12' to maintain uprights 11, 11' in slideable position overtop base rails 12, 12'. Transfer rod 14 is affixed between posts 15, 15', and post coupling 23 with handle 22 is affixed to post 15' as seen in FIG. 1. After hitch assembly 10 is installed, longitudinal displacement of fifth wheel 13 may occur via rollers 47 by manually engaging handle 22, for example by rotating and pulling handle 22 in a vector away from uprights 11, 11'. This rotation and displacement causes corresponding rotation and displacement of indicator pins 18 that results in arms 44, 44' of lifts 31 to urge locking pins 26 in an upward direction, removing pins 26 from first apertures in base rails 12, 12'. With locking pins 26 in the disengaged position both vertically and horizontally, uprights 11, 11' are clear to longitudinally displace whereby locking pins 26 will then engage second apertures 54 in base rails 12, 12', for example moving fifth wheel 13 further away from a tow vehicle to allow for greater maneuverability of the towed load in confined areas such as parking lots and camp grounds. When the need to shorten the distance between fifth wheel 13 and a tow vehicle arises, handle 22 may be manually rotated and pushed in a vector towards uprights 11, 11', causing posts 15, 15', indicator pins 18 and lifts 31 to correspondingly displace laterally, forcing locking pins 26 to exit second apertures 54 and allow uprights 11, 11' to longitudinally displace into a position overtop corresponding first apertures 52 in base rails 12, 12' allowing for insertion of locking pins 26 due to the downward bias provided by biasing member 32.

For safety and conformational convenience, an embodiment of hitch assembly 10 may require a dual-stage confirmation that longitudinal displacement of fifth wheel 13 is desired. Therefore, hitch assembly 10 may further include providing safety pin 50 on lanyard 49 which may be attached to handle 22. Pin 50 can be inserted through opposing apertures 70 (FIGS. 1 and 6A) in the side walls of upright 11 and engage locking mechanism 29, preventing rotation of lift 31 and therefore the displacement of locking pin 26. Should locking mechanism 29 not be fully engaged, pin 50 cannot be inserted in upright 11 as lift 31 obstructs the passage of pin 50 therethrough (see FIG. 7A). As seen in FIG. 6A, aperture 70 is positioned directly above lift 31 whereby with safety pin 50 in position within upright 11, lift 31 could not be lifted thus preventing dislodgement of locking mechanism 29. Safety pin 50 would need to be removed from upright 11 for positioning and returned therein to assure the desired position is locked in place. Although not shown a second safety pin 50 with lanyard 49 could be provided.

The illustrations and examples provided herein are for explanatory purposes and are not intended to limit the scope of the appended claims. Many of the components of hitch assembly are described as singular for the sake of brevity and clarity, but it should be understood that many components such as upright 11, locking mechanism 29, base rails 12, and others are provided in duplicate as indicated in the figures.

We claim:

1. A slideable hitch assembly comprising: a fifth wheel, an upright defining an opposing pair of apertures, said upright slidably supporting said fifth wheel, a base rail defining an aperture, a roller positioned within said aperture and protruding therefrom, a locking mechanism positioned within said upright comprising a locking pin, a lift oriented substantially perpendicular relative to said locking pin, and a post positioned within said pair of opposing apertures and rotatably attached to said lift, said locking pin oriented substantially perpendicular relative to said post, said lift defining a pin channel for receiving said locking pin therein, wherein engaging said locking pin with said lift via said post permits longitudinal displacement of said upright via slidable contact with said roller.

2. The hitch of claim 1 further comprising a planar base, said planar base attached to said upright.

3. The hitch of claim 2 further comprising a pair of flanges, said flanges affixed in opposing relation to said planar base.

4. The hitch of claim 1 further comprising an indicator pin, said indicator pin engaging said post.

5. The hitch of claim 1 further comprising a handle, said handle attached to said post, wherein rotating said handle correspondingly rotates said post.

6. The hitch of claim 1 wherein said base rail defines a U-shaped cross-section.

7. The hitch of claim 1 wherein said upright defines an opening and includes a selector plate, said selector plate positioned over said opening to define first and second indicator channels.

8. A slideable hitch assembly comprising: a fifth wheel, a pair of uprights, each upright defining an opposing pair of apertures, a pair of planar bases, said planar bases attached to different ones of said uprights, said pair of uprights slidably supporting opposing sides of said fifth wheel, a pair of base rails, said pair of base rails positioned in parallel alignment to said planar bases, said base rails defining a plurality of apertures, a plurality of rollers, said rollers positioned within different ones of said apertures and protruding therefrom, a locking mechanism positioned within each of said uprights, each locking mechanism comprising a locking pin, a lift defining a pair of arms oriented substantially perpendicular relative to said locking pin, and a post positioned within said pair of opposing apertures and rotatably attached to said lift, said locking pin oriented substantially perpendicular relative to said post, said arms spaced to form a pin channel for receiving said locking pin therein, wherein engaging said locking pins with said lifts via said posts permits longitudinal displacement of said uprights via rotatable contact with said plurality of rollers.

9. The hitch of claim 8 further comprising a pair of biasing members, said biasing members engaging and biasing different ones of said locking pins.

10. The hitch of claim 8 wherein each of said planar bases further comprises a pair of flanges, said flanges affixed in opposing relation to different ones of said planar bases.

11. The hitch of claim 8 wherein said uprights each define an opening, a pair of selector plates, each of said selector plates positioned over different ones of said openings to define first and second selector channels, a pair of indicator pins, said indicator pins positioned within different ones of said openings and engaging different ones of said posts.

12. The hitch of claim 8 wherein each of said base rails defines a pair of tabs, said tabs positioned in opposing relation on each of said base rails.

13. The hitch of claim 8 further comprising a handle, said handle attached to at least one of said posts, wherein rotating said handle correspondingly rotates said at least one post.

14. The hitch of claim 11 wherein displacing said indicator pins from said first selector channels to said second selector channels correspondingly displaces said pair of posts.

15. The hitch of claim 14 where the displacement is lateral displacement relative to said hitch.

16. The hitch of claim 12 wherein said tabs are downwardly depending in opposing relation to said uprights.

17. The hitch of claim 1 whereby said locking pin defines a vertical axis that is offset relative to a vertical axis defined by said upright.

18. The hitch of claim 1 whereby said locking pin defines a cylindrical body with an upper portion with a first diameter, a middle portion with a second diameter, and a lower portion with a third diameter, said third diameter greater than said second diameter and said first diameter less than said second diameter.

19. The hitch of claim 18 further comprising an upper disk and a lower disk positioned on said locking pin, said lower disk having a diameter greater than said third diameter and forming a circular shape with a planar surface, said upper disk defining a two-tiered member with a circular shape.

20. The hitch of claim 1 whereby said lift is comprised of a U-shaped lift body defining a post aperture and a pair of arms extending in parallel from said lift body to form said pin channel, each of said arms defining a bulbous terminal end opposite said lift body.

* * * * *